United States Patent [19]

Tsuchiya et al.

[11] 3,761,617

[45] Sept. 25, 1973

[54] DC ELECTROLUMINESCENT CROSSED-GRID PANEL WITH DIGITALLY CONTROLLED GRAY SCALE

[75] Inventors: Mitsuharu Tsuchiya, Osaka; Teruo Sato, Kyoto; Hitoshi Takeda; Masami Yoshiyama, both of Osaka, all of Japan

[73] Assignee: Matsushita Electric Industrial Co., Ltd., Osaka, Japan

[22] Filed: June 17, 1971

[21] Appl. No.: 153,946

[30] Foreign Application Priority Data

| | | |
|---|---|---|
| June 20, 1970 | Japan | 45/53619 |
| June 23, 1970 | Japan | 45/54893 |
| June 23, 1970 | Japan | 45/54894 |

[52] U.S. Cl. .......... 178/7.3 D, 315/169 TV

[51] Int. Cl. .......... H04n 5/30

[58] Field of Search .......... 315/169 TV; 313/108 B, 108 C, 108 D; 250/213 A; 178/7.3 D, 7.5 D

[56] References Cited

UNITED STATES PATENTS

| | | | |
|---|---|---|---|
| 3,526,711 | 9/1970 | Boer | 178/7.3 D |
| 3,590,156 | 6/1971 | Easton | 178/7.5 D |

*Primary Examiner*—Robert L. Griffin
*Assistant Examiner*—George G. Stellar
*Attorney*—E. F. Wenderoth et al.

[57] ABSTRACT

A scanning apparatus for a DC electroluminescent crossed-grid panel has an X-line driving circuit, a Y-line driving circuit, a video signal generator, a timing signal generator, a sample-hold circuit, an analog-to-digital converter, and a width-control signal generator. The Y-line driver has a set of first memory circuits for writing sequentially coded video signals for one horizontal line period, a set of second memory circuits for simultaneously holding the coded video signals during one horizontal line period, and a set of brightness control circuits for supplying Y-line driving pulses to corresponding Y-lines in response to the coded video signals.

6 Claims, 8 Drawing Figures

INVENTORS
MITSUHARU TSUCHIYA
TERUO SATO
HITOSHI TAKEDA
MASAMI YOSHIYAMA
BY Wenderoth, Lind & Ponack
ATTORNEYS

INVENTORS
MITSUHARU TSUCHIYA
TERUO SATO
HITOSHI TAKEDA
MASAMI YOSHIYAMA

BY Wenderoth, Lind & Ponack
ATTORNEYS

INVENTORS
MITSUHARU TSUCHIYA
TERUO SATO
HITOSHI TAKEDA
MASAMI YOSHIYAMA
BY Wenderoth, Lind & Ponack
ATTORNEYS

INVENTORS
MITSUHARU TSUCHIYA
TERUO SATO
HITOSHI TAKEDA
MASAMI YOSHIYAMA

BY Wenderoth, Lind & Ponack
ATTORNEYS

INVENTORS
MITSUHARU TSUCHIYA
TERUO SATO
HITOSHI TAKEDA
MASAMI YOSHIYAMA

BY Wenderoth, Lind & Ponack
ATTORNEYS

DC ELECTROLUMINESCENT CROSSED-GRID PANEL WITH DIGITALLY CONTROLLED GRAY SCALE

BACKGROUND OF THE INVENTION

1. Field of the Invention

The invention relates to a scanning apparatus for a solid state display panel, and more particularly to a scanning apparatus capable of reproducing moving, half-tone images on a DC electroluminescent crossed-grid panel from a coded video signal.

2. Description of the Prior Art

Electroluminescent crossed-grid panels which have a multiplicity of electroluminescent elements located in a matrix form at the intersections of X (horizontal) and Y (vertical) line conductors are well known. In order to reproduce images on such panels from image information signals, scanning is necessary. In general, the scanning is carried out by selecting X and Y lines in a predetermined sequence and applying proper voltages between the selected X and Y lines. The brightness of the electroluminescent elements is modulated by varying the amplitude or width of the applied pulses in accordance with the image information signals.

In some devices the electroluminescent elements of the crossed-grid panel are scanned sequentially element by element, analogous to the scanning of a cathode ray tube in a conventional television set. Application of such element-by-element scanning to the crossed grid panel with a large number of electroluminescent elements results in low brightness due to the short time the electroluminescent elements are excited. Line-by-line scanning using line memory means is generally carried out instead of the above scanning, in order to increase the brightness of the reproduced images.

Undesired luminosity is, however, generated from unselected electroluminescent elements due to electrical coupling among them. This so-called cross effect problem is more severe in line-by-line scanning than in element-by-element scanning. One electroluminescent matrix display including means for reducing the cross-effect in a line-by-line scanning system has been disclosed in "Electronics" Magazine, Mar. 17, 1969, published in the U.S.A., in an article entitled "Lighting the Way to Flat Screen TV", written by M. Yoshiyama, one of the present applicants. However, further improvement is necessary in simplifying the circuits and reducing the size of the device. For this purpose, the scanning circuits are currently being replaced with integrated circuits by processing the video signal digitally. Adoption of the integrated circuits can reduce the size of the scanning apparatus.

SUMMARY OF THE INVENTION

It is, therefore, an object of the invention to provide an improved scanning apparatus for a DC electroluminescent crossed-grid panel capable of satisfactorily reproducing moving, half-tone images from a coded video signal with simplified circuitry.

It is another object of the invention to provide an improved scanning apparatus capable of digitally controlling the brightness by digital circuits in integrated circuit form.

The present scanning apparatus for a DC electroluminescent crossed-grid panel comprises a X-line driving circuit, a Y-line driving circuit, a video signal generator, a timing signal generator, a sample-hold circuit, and analog-to-digital converter, and a width-control signal generator. The Y-line driver comprises a set of first memory circuits for writing sequentially coded video signals for one horizontal line period, a set of second memory circuits for simultaneously holding the coded video signals during one horizontal line period, and a set of brightness control circuits for supplying Y-line driving pulses to corresponding Y-lines in response to the coded video signals.

BRIEF DESCRIPTION OF THE FIGURES

More details of the present scanning apparatus and its features will become apparent upon consideration of the following description taken together with the accompanying drawings, in which.

DESCRIPTION OF THE PREFERRED EMBODIMENT

Figure 1:
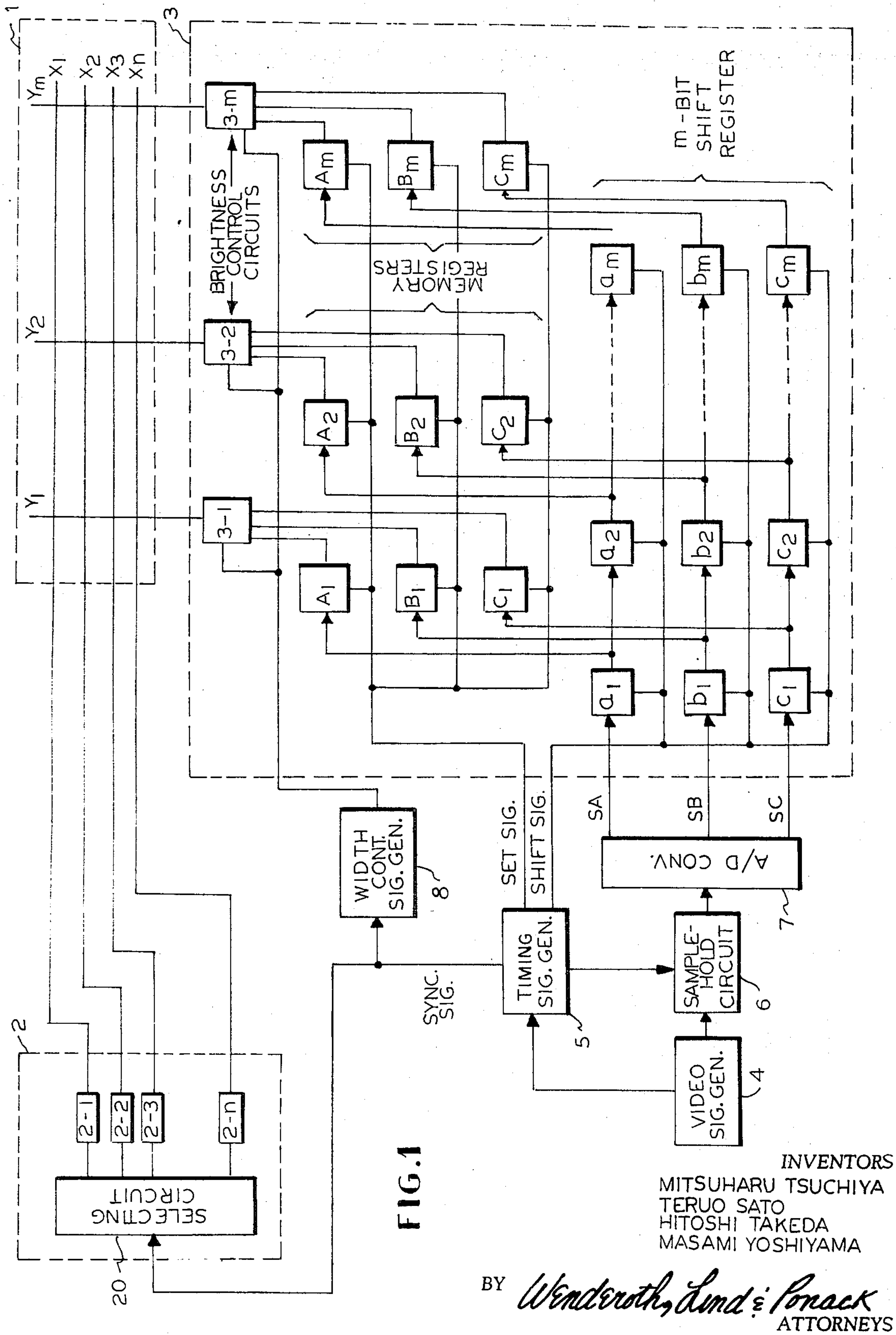
FIG. 1 is a block diagram of the scanning apparatus for a D.C. electroluminescent crossed-grid panel according to the invenction.
Figure 2:
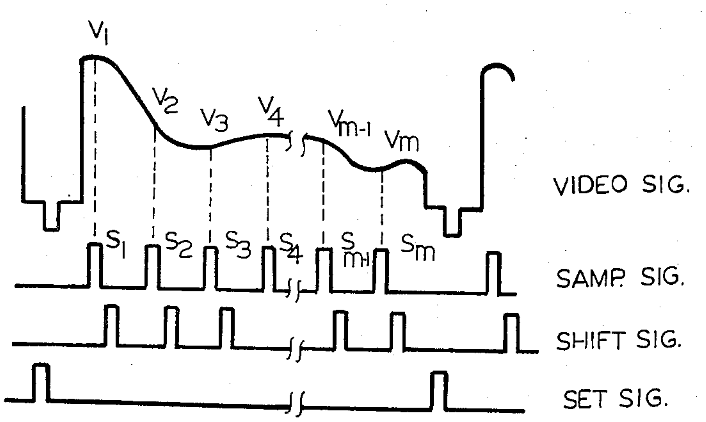
FIG. 2 is a timing chart of signals for illustrating the operation of the scanning apparatus shown in FIG. 1.

In FIG. 1 the scanning apparatus for a DC electroluminescent crossed-grid panel 1 includes an X-line driving circuit 2, a Y-line driving circuit 3, a video signal generator 4, a timing signal generator 5, a sample-hold circuit 6 connected to outputs from the video signal generator 4, an analog-to-digital (A-D) converter 7 connected to the output of the sample hold circuit 6, and a width-control signal generator 8 The timing signal generator 5 supplies the X-line driving circuit 2, Y-line driving circuit 3, the sample-hole circuit 6 and the width-control signal generator 8 with various kinds of the timing signals such as vertical and horizontal synchronizing signals, set signals, shift signals and sampling signals corresponding to the video signal as shown in FIGS. 1 and 2. The DC electroluminescent crossed-grid panel 1 comprises three main elements: a DC electroluminescent layer (not shown), X-line conductors $X_1$, $X_2$, . . . $X_j$ . . . $X_n$, and Y-line conductors $Y_1$, $Y_2$, . . . $Y_j$ . . . $Y_m$. The DC electroluminescent layer is sandwiched between the X and Y-line conductors $X_j$, $Y_j$. Accordingly, the panel 1 has a well-known crossed-grid structure, a multiplicity of DC electroluminescent elements being formed in a matrix at the intersections of the X and Y line conductors $X_j$, $Y_j$. The DC electroluminescent layer can be, for example, a vacuum-evaporated zinc sulphide thin film activated by manganese, copper and chlorine, or a forming-processed DC electroluminescent layer composed of copper-coated zinc sulphide powder ZnS (Mn, Cu, Cl) embedded in a plastic binder. Light emitting diodes can also be used as the DC electroluminescent elements. The well-known X-line driving circuit 2 comprises an X-line selecting circuit 20 and a set of pulse generators 2–1, 2—2 . . . 2–$n$. The Y-line driving circuit 3 comprises a set of brightness control circuits 3–1, 3–2 . . . 3–$m$, a set of memory registers, and an m-bit shift register.

The operation of the present scanning apparatus will be described in conjunction with FIGS. 1 and 2 for the case where 3-bit parallel coded video signals converted from standard television signals are used as image information signals. In the X-line scanning, the X-line to be scanned is selected by the X-line selecting circuit in predetermined sequence in response to horizontal synchronizing signals from the timing signal generator 5, and is supplied with an X-line selecting pulse by the selected pulse generator. The X-line driving circuit 2 also supplies the remaining X-lines with suppressing pulses or biasing voltages for reducing the cross effect which decreases the contrast of the images.

In the Y-line scanning, video signals are generated in the video signal generator 4, and are supplied to the sample-hold circuit 6. A series of sampling signals $s_1$, $s_2$ . . . $s_m$ corresponding to the Y lines $Y_1$, $Y_2$ . . . $Y_m$, is generated in the timing signal generator 5, subsequent to the end of a horizontal blanking period of the standard television signal as shown in FIG. 2. The video signal for one horizontal line period is sampled sequentially by the sampling signals $s_1$, $s_2$ . . . $s_m$ at every sampling time in the sample hold circuit 6. Each of the sampled video signals $v_1$, $v_2$ . . . $v_m$ is quantized to one of eight quantizing levels in the A-D converter 7, and is converted into a 3-bit parallel-coded video signal (SA, SB, SC) according to Table 1.

TABLE 1

| Quantizing Level | 3-bit Parallel-Coded Video Signal SA | SB | SC |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

The coded video signal (SA, SB, SC) is then supplied to the first flip-flops ($a_1$, $b_1$, $c_1$) of the 3-bit parallel m-bit shift register ($a_1$, $b_1$, $c_1$), ($a_2$, $b_2$, $c_2$) . . . ($a_m$. $b_m$, $c_m$), and is shifted to the next flip-flops ($a_2$, $b_2$, $c_2$) by a shift signal. As a series of shift signals is generated corresponding to the series of sampling signals $s_1$, $s_2$, . . . $s_m$ during one horizontal line period, as shown in FIG. 2, the coded video signals ($SA_j$, $SB_j$, $SC_j$) are written sequentially into the shift register and are shifted in turn by the shift signal from left to right in the shift register. Therefore, writing of the video signals for one horizontal line period in the shift register will be completed by the inputs of the series of sampling and shift signals. By a set signal which is generated in the timing signal generator 5, all of the coded video signals ($SA_j$, $SB_j$, $SC_j$) written into the shift register ($a_j$, $b_j$, $c_j$) are simultaneously transferred to the corresponding memory register ($A_j$, $B_j$, $C_j$), being held there until the next set signal arrives being used as one of the input signals for the corresponding brightness control circuits 3–1, 3–2, . . . 3–m.

Figure 3:
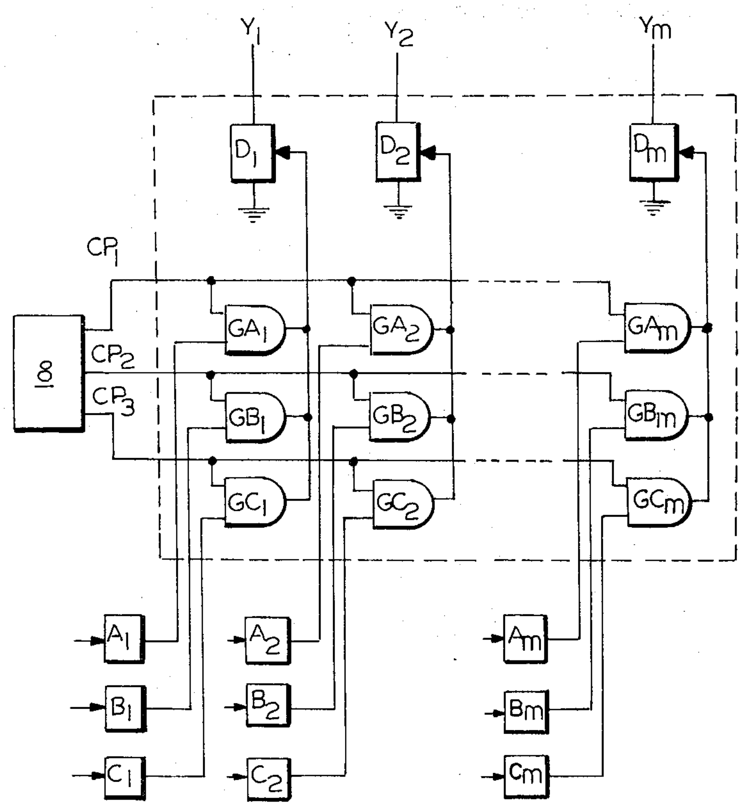
FIG. 3 is a circuit diagram of a set of brightness control circuits.
Figures 4, 5:
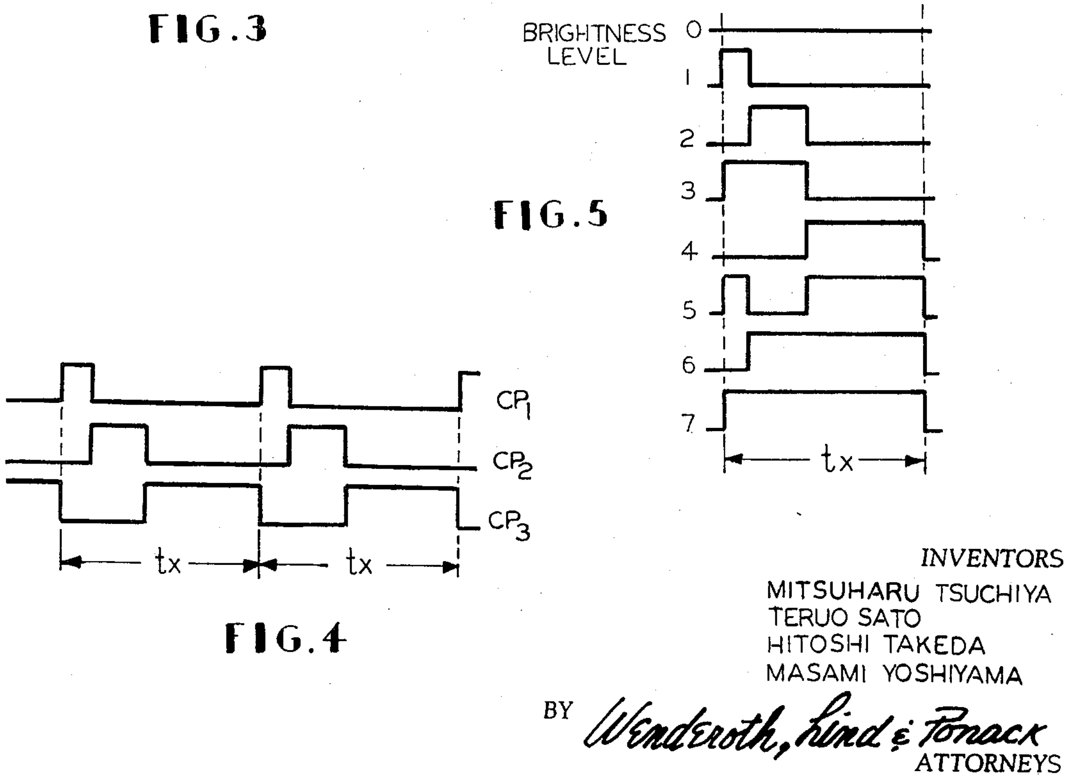
FIG. 4 is a timing chart of width-control signals.
FIG. 5 shows the relation between brightness levels and brightness control signals.

Referring to FIGS. 3, 4 and 5, the operation of the brightness control circuits will be described in more detail. Each of the brightness control circuits 3–$j$ ($j$=1,2,3. . . $m$) comprises a driver $D_j$ and 3 parallel connected AND gates ($GA_j$, $GB_j$, $GC_j$), each of the AND gates having two inputs. The width-control signal generator 8 supplies the inputs of the respective gates ($GA_j$, $GB_j$, $GC_j$) with three width-control signals $CP_1$, $CP_2$ and $CP_3$, respectively, which are not time coincident with each other, during one horizontal line period $t_x$, as shown in FIG. 4. In this case, the width-control signals $CP_1$, $CP_2$, and $CP_3$ also have different pulse widths from each other, and are in a pulse-width relation of 1:2:4, where 1 corresponds to the time interval of one-seventh of the horizontal line period $t_x$. When at least one of the gates ($GA_j$, $GB_j$, $GC_j$) is activated by a width-control signal $CP_1$, $CP_2$, or CP $_3$ and a coded video signal ($SA_j$, $SB_j$, $SC_j$), a brightness control signal is supplied to the driver $D_j$ which acts as a switch to flow current through a $Y_j$ line.

The brightness control signals are quantized width-modulated signals which are synthesized by the AND function of the AND gates ($GA_j$, $GB_j$, $GC_j$) from a 3-bit parallel-coded video signal ($SA_j$, $SB_j$, $SC_j$) and a width-control signal ($CP_1$, $CP_2$, $CP_3$). For example, when only the signal $SA_j$ is in the logic level "1," i.e., the 3-bit parallel video signal is (SA=1, SB=0, SC=0), the brightness control signal corresponds to the brightness level "1" shown in FIG. 5, whereas only the gate $GA_j$ is activated. The brightness control signal is not always a single pulse for any brightness level, for example, like the brightness level "5" shown in FIG. 5. However, since the brightness depends on the integrated value of light output, eight brightness levels can be given in this case. Thus, the driver $D_j$ supplies the $Y_j$ line with a $Y_j$ line driving pulse corresponding to the wave-form of the brightness control signal.

Consequently, the DC electroluminescent elements along the selected X-line emit light simultaneously by the application of the X-line selecting pulse and the corresponding Y-line driving pulses in response to the video signal. By repeating this operation for every horizontal line period, the DC electroluminescent elements in the whole panel are scanned sequentially line by line from the $X_1$ line to the $X_n$ line. The scanning of the whole panel will be accomplished in this manner. Although the above description has been given with reference to the use of 3-bit parallel coded video signals as the image information signals, it will be understood that an n-bit parallel coded video signal can be used as the image information signal in the same manner.

Figure 6:
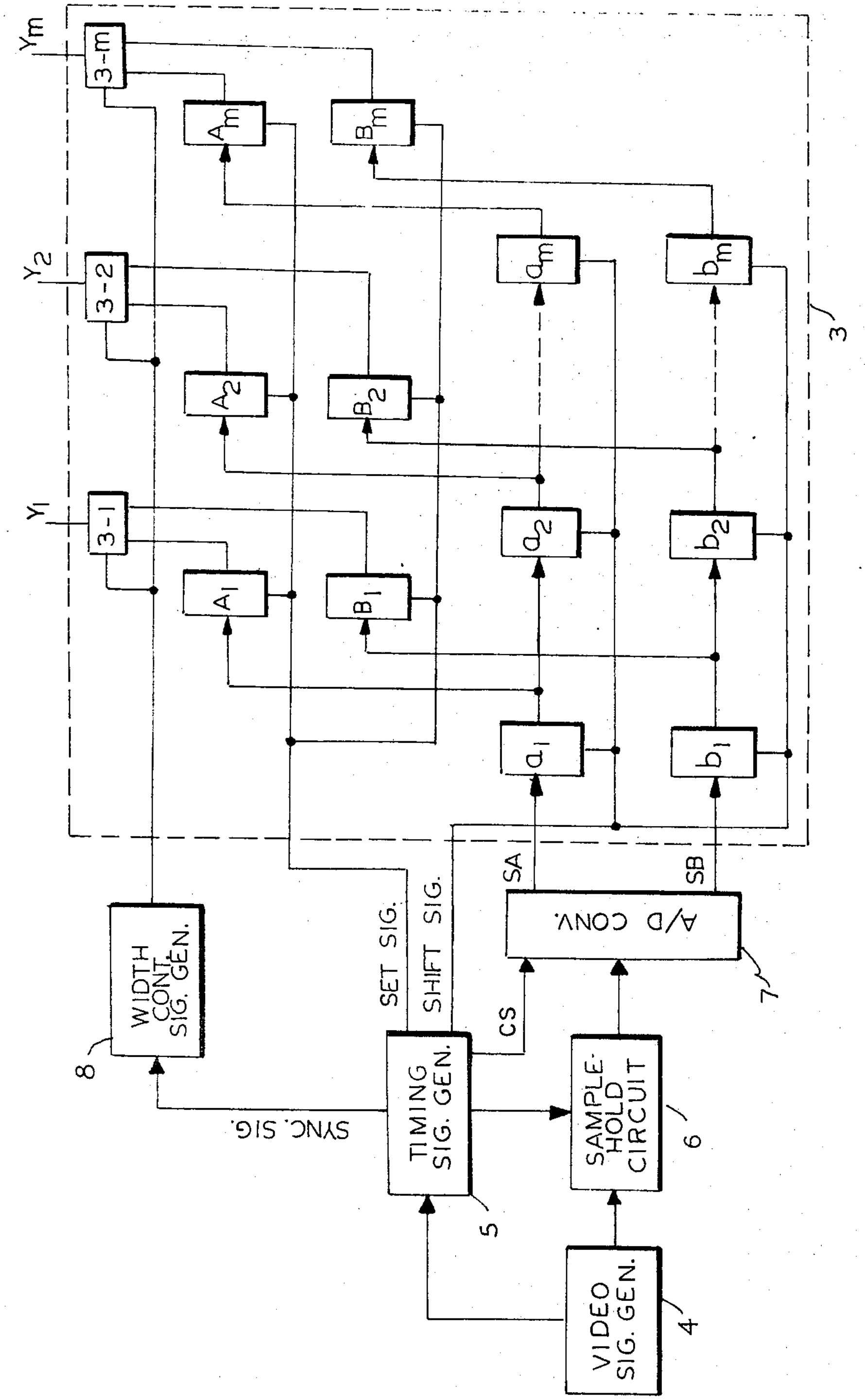
FIG. 6 is a block diagram of another embodiment of the present scanning apparatus according to the invention.

FIG. 6 shows another embodiment of the present scanning apparatus which can faithfully reproduce half-tone images with fewer bits coded video signals by means of an improved A-D conversion of the A-D converter. For simplicity, a 2-bit parallel coded video signal ($SA_j$, $SB_j$) is used as the image information signal in the scanning apparatus shown in FIG. 6. In FIG. 6 the configuration of the brightness control circuits, the memory registers, and the shift register are simplified so as to be in a 2-bit form in accordance with the use of a 2-bit parallel-coded video signal, but their operations are the same as that shown in FIGS. 1 and 3. The A-D converter 7 has two A-D conversion states $CR_1$ and $CR_2$ which are changed by a quantizing level control signal CS from the timing signal generator. The A-D conversion of sampled video signals for one image in the A-D converter 7 is divided into two field periods so that the sampled video signals for one image are converted in the first and the second field periods with an A-D conversion state $CR_1$ and $CR_2$, respectively. When a sampled video signal voltage is, for example, in the quantizing level "3," it is converted into a 2-bit parallel-coded video signal (SA=0, SB=1) with the A-D conversion state $CR_1$ in the first field, and another 2-bit parallel coded video signal (SA=1, SB=0) with the A-D conversion state $CR_2$ in the second field, as shown in Table 2. These correspond to brightness levels "2" and "1," respectively.

TABLE 2

| Quantizing Level | First Field Brightness Level | SA | SB | Second Field Brightness Level | SA | SB | Resultant Brightness Level |
|---|---|---|---|---|---|---|---|
| 0 | 0 | 0 | 0 | 0 | 0 | 0 | 0 |
| 1 | 1 | 1 | 0 | 0 | 0 | 0 | 1 |
| 2 | 1 | 1 | 0 | 1 | 1 | 0 | 2 |
| 3 | 2 | 0 | 1 | 1 | 1 | 0 | 3 |
| 4 | 2 | 0 | 1 | 2 | 0 | 1 | 4 |
| 5 | 3 | 1 | 1 | 2 | 0 | 1 | 5 |
| 6 | 3 | 1 | | 13 | 1 | 1 | 6 |

As a result, the resultant brightness level through two field periods corresponds visually to the brightness level "3" for the above sampled video signal. Thus, the available number of the brightness levels can be increased up to seven by utilizing the 2-bit parallel coded video signal through two field periods for one image, as shown in Table 2.

When the A-D conversion state of the sampled video signals in the A-D converter 7 is changed for every field, the quantizing level control signal (CS) is synchronized with the vertical synchronizing signal of the standard television signal. When being changed every horizontal line period, the quantizing level control signal (CS) is synchronized with the horizontal synchronizing signal.

Similarly, fifteen brightness levels can be controlled by utilizing the 3-bit parallel coded video signals through two field periods for one image.

Figure 7:
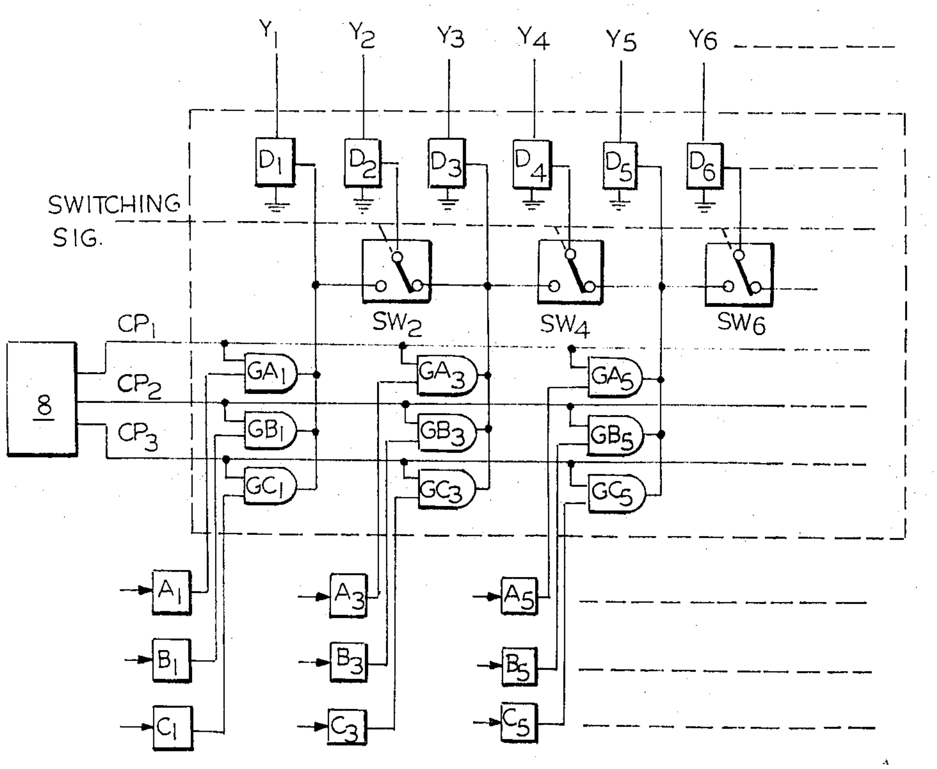
FIG. 7 shows a circuit diagram of an improved Y-line driving circuit.

FIG. 7 shows a simplified Y-line driving circuit. In FIG. 7 the configuration of the Y-line driving circuit for every other Y line, for example, odd numbered Y-lines $Y_1, Y_3, Y_5$ . . . , are the same as that shown in FIGS. 1 and 3. That is, for the odd numbered Y lines $Y_1, Y_3, Y_5$, . . . ., odd numbered flip-flops $(a_1, b_1, c_1)$, $(a_3, b_3, c_3)$, $(a_5, b_5, c_5)$, . . . . of the 3-bit parallel shift register, and odd numbered memory registers $(A_1, B_1, C_1)$, $(A_3, B_3, C_3)$, $(A_5, B_5, C_5)$, . . . ., and odd numbered brightness control circuits (3–1), (3—3), (3–5), . . . . are provided, each of the odd numbered brightness control circuits (3–1), (3—3), (3–5), . . . . comprising odd numbered drivers $D_1, D_3, D_5$ . . . ., and odd numbered AND gates $(GA_1, GB_1, GC_1)$, $(GA_3, GB_3, GC_3)$, $(GA_5, GB_5, GC_5)$, . . . ., respectively. For the remaining Y-lines, for example, even numbered Y-lines $Y_2, Y_4, Y_6$ . . ., no memory registers and shift registers are provided. The even numbered brightness control circuits (3–2), (3–4), (3–6) . . . for the even numbered Y-lines $Y_2, Y_4, Y_6$ . . . comprise even numbered drivers $D_2, D_4, D_6$ . . . and switching circuits $SW_2, SW_4, SW_6$ . . . . Each of the switching circuits $SW_j$ is coupled to the adjacent two odd numbered AND gates $(GA_{j-1}, GB_{j-1}, GC_{j-1})$ and $(GA_{j+1}, GB_{j+1}, GC_{j+1})$ in the two odd numbered brightness control circuits. The even numbered driver $D_j$ ($j$ = 2, 4, 6 . . .) are selectively supplied with one of the brightness control signals from the AND gates $(GA_{j-1}, GB_{j-1}, GC_{j-1})$ and $(GA_{j+1}, GB_{j+1}, GC_{j+1})$ in the adjacent two odd numbered brightness control circuits through the switching circuits $SW_j$ which are switched by a switching signal from the timing signal generator 5. The switching signal is synchronized with the vertical synchronizing signal of the video signal.

Figure 8:
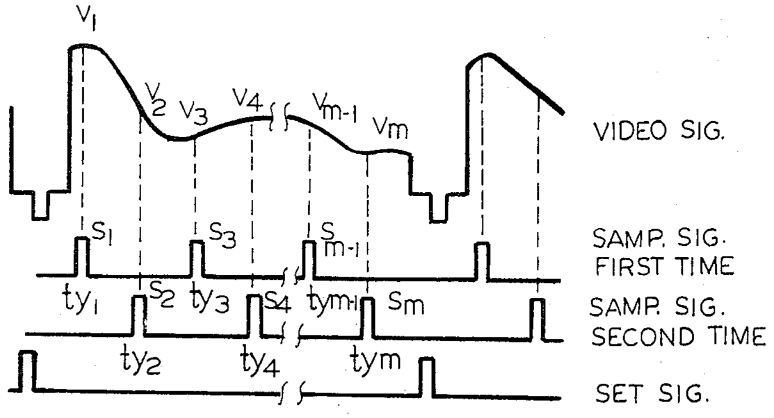
FIG. 8 is a timing chart of signals for illustrating the operation of the improved Y-line driving circuit shown in FIG. 7.

The operation of the Y-line driving circuit shown in FIG. 7 will be described in more detail referring to FIG. 7 and FIG. 8. In FIG. 8, $t_{v1}, t_{v2} \ldots t_{vm}$ denote the sampling times for the sampling signals $s_1, s_2 \ldots s_m$. In the first field period, the video signal voltages $v_1, v_3, v_5$ . . . . at the sampling times $t_{v1}, t_{v3}, t_{v5}$ . . . . are sampled sequentially by odd numbered sampling signals $s_1, s_3, s_5$ . . . and are written sequentially into the shift register after A-D conversion in the A-D converter 7. The operation of the shift register, the memory registers, and the odd numbered brightness control circuits are the same as in FIGS. 1 and 3. When the switching circuits $SW_2$, $SW_4, SW_6$ . . . in the even numbered brightness control circuits are connected to the left side during the first field period, the pairs of Y lines $(Y_1,Y_2)$, $(Y_3, Y_4)$, $(Y_5, Y_6)$ . . . are then driven during the first field period by the same brightness control signals corresponding to the video signal voltage $v_1, v_3, v_5$ . . . respectively. By repeating such operation during every horizontal line period during the first field period, the scanning for the first field period is thus carried out. In the second field period, the video signal voltages $v_2, v_4, v_6$ . . . at the sampling times $t_{v2}, t_{v4}, t_{v6}$ . . . are sampled sequentially by the even numbered sampling signals $s_2, s_4, s_6$ . . . . As the switching circuits $SW_2, SW_4, SW_6$ . . . are now switched to the right side by the switching signal in synchronizing with vertical synchronizing signals in the second field period, the pairs of Y line $(Y_2,Y_3)$, $(Y_4, Y_5)$, $(Y_6, Y_7)$ . . . are driven during the second field period by the same brightness control signal corresponding to the video signal voltage levels $v_2, v_4, v_6$ . . . , respectively. The scanning for the second field period is carried out in the same manner.

What we claim is:

1. A scanning apparatus for a DC electroluminescent crossed-grid panel having a multiplicity of electroluminescent elements at the intersections of X and Y-line conductors, said scanning apparatus comprising an X-line driving circuit coupled to said X-line conductors for supplying X-line selecting pulses to the X-line conductors to be scanned in predetermined sequence; a Y-line driving circuit coupled to said Y-line conductors; a video signal generator for generating video signals; a timing signal generator coupled between said video signal generator, said Y-line driving circuit and said X-line driving circuit; a sample-hold circuit coupled to said video signal generator and said timing signal generator for sampling said video signals by sampling signals from said timing signal generator; an analog-to-digital converter coupled between said sample-hold circuit and said Y-line driving circuit for converting the sampled video signals into coded video signals which are supplied to said Y-line driving circuit; and a width-control signal generator coupled between said timing signal generator and said Y-line driving circuit for supplying said Y-line driving circuit with a plurality of width-control signals which are not time coincident with each other; said Y-line driving circuit comprising a set of first memory circuits for sequentially writing said coded video signals for one horizontal line period from said analog-to-digital converter, a set of second memory circuits coupled to the memory circuits in said set of first memory circuits for holding simultaneously said coded video signals from said set of first memory circuits during one X-line period, and a set of brightness control circuits coupled to said memory circuits in said set of second memory circuits, and each circuit of said set of brightness control circuits consisting of a driver for supplying a Y-line driving pulse to a corresponding Y-line and a plurality of AND gates coupled between a corresponding memory circuit in said set of second memory circuits, said width control signal generator and said driver for supplying said driver with brightness control signals which are synthesized, at said plurality of AND gates, from said plurality of width-control signals and said coded video signals.

2. A scanning apparatus as claimed in claim 1 wherein said set of first memory circuits, said second memory circuits and said plurality of AND gates are an n-bit parallel shift register, an n-bit parallel memory register, and n parallel-connected AND gates, respectively, so that said coded video signals are n-bit parallel-coded video signals.

3. A scanning apparatus as claimed in claim 1 wherein said width-control signal generator generates n width-control signals which are not time coincident with each other, and which are different in the pulse-wdith from each other and are in a pulse-width relation: $2^0$: $2^1$: $2^2$ . . . :$2^{n-1}$ in one X-line period.

4. A scanning apparatus as claimed in claim 1 wherein said analog-to-digital converter is directly coupled to said timing signal generator and has two analog-to-digital conversion states which are changed by quantizing level control signals in synchronization with vertical synchronizing signals of the video signal, whereby the analog-to-digital conversion of sampled video signals for one image is divided into two field periods so that the sampled video signals are converted with the first and the second analog-to-digital conversion states in the first and the second field periods, respectively.

5. A scannong apparatus for a DC electroluminescent crossed-grid panel having a multiplicity of electroluminescent elements at the intersections of X and Y-line conductors, said scanning apparatus comprising an X-line driving circuit coupled to said X-line conductors for supplying X-line selecting pulses to the X-line conductors to be scanned in predetermined sequence; a Y-line driving circuit coupled to said Y-line conductors; a video signal generator for generating video signals; a timing signal generator coupled between said video signal generator, said Y-line driving circuit and said X-line driving circuit; a sample-hold circuit coupled to said video signal generator and said timing signal generator for sampling said video signals by sampling signals from said timing signal generator; an analog-to-digital converter coupled between said sample-hold circuit and said Y-line driving circuit for converting the sampled video signals into coded video signals which are supplied to said Y-line driving circuit; and a width-control signal generator coupled between said timing signal generator and said Y-line driving circuit for supplying said Y-line driving circuit with a plurality of width-control signals which are not time coincident with each other; said Y-line driving circuit comprising a set of first memory circuits for sequentially writing said coded video signals for one horizontal line period from said analog-to-digital converter, a set of second memory circuits coupled to the memory circuits in said set of first memory circuits for holding simultaneously said coded video signals from said set of first memory circuits during one X-line period, and a set of brightness control circuits coupled to said memory circuits in said set of second memory circuits, said set of brightness control circuits consisting of even numbered brightness control circuits alternating with odd numbered brightness control circuits, each of the odd numbered brightness control circuits consisting of a driver for supplying a Y-line driving pulse to a corresponding Y-line and a plurality of AND gates coupled between a corresponding memory circuit in said set of second memory circuits, said width control signal generator and said driver for supplying said driver with brightness control signals which are synthesized, at said plurality of AND gates, from said plurality of width-control signals and said coded video signals, and each of the even numbered brightness control circuits consisting of a driver for supplying a Y-line driving pulse to a corresponding Y-line and a switching circuit which is coupled to said timing signal generator so as to receive a switching signal from said timing signal generator and which is also coupled to the two odd numbered AND gates in the two adjacent odd numbered bright-ness control circuits so that one of the brightness control signals from the said two odd numbered AND gates selectively operates the driver of the even numbered brightness control circuit when switched by said switching signals in synchronization with a synchronizing signal of the video signal, and said sample-hold circuit is coupled to said timing signal generator so that the sampling time of the video signal is selectively switched between the sampling time for odd and even numbered sampling signals by said switching signal.

6. A scanning apparatus as claimed in claim 5 wherein said synchronizing signal of the video signal is a vertical synchronizing signal of the video signal.

* * * * *